United States Patent
Melack et al.

(10) Patent No.: US 10,756,398 B2
(45) Date of Patent: Aug. 25, 2020

(54) CAPACITANCE REDUCING BATTERY SUBMODULE WITH THERMAL RUNAWAY PROPAGATION PREVENTION AND CONTAINMENT FEATURES

(71) Applicant: Wisk Aero LLC, Mountain View, CA (US)

(72) Inventors: John Melack, Redwood City, CA (US); Thomas P. Muniz, Sunnyvale, CA (US); Colin Charles Brey, Sunnyvale, CA (US)

(73) Assignee: WISK AERO LLC, Mountain View, CA (US)

( * ) Notice: Subject to any disclaimer, the term of this patent is extended or adjusted under 35 U.S.C. 154(b) by 0 days.

(21) Appl. No.: 16/438,963

(22) Filed: Jun. 12, 2019

(65) Prior Publication Data

US 2019/0393570 A1    Dec. 26, 2019

Related U.S. Application Data

(60) Provisional application No. 62/688,744, filed on Jun. 22, 2018.

(51) Int. Cl.
*H01M 10/617* (2014.01)
*H01M 10/658* (2014.01)
(Continued)

(52) U.S. Cl.
CPC .......... *H01M 10/617* (2015.04); *H01M 2/04* (2013.01); *H01M 2/1077* (2013.01);
(Continued)

(58) Field of Classification Search
CPC ...... H01M 2/10; H01M 2/1038; H01M 2/105; H01M 2/1061; H01M 10/60;
(Continued)

(56) References Cited

U.S. PATENT DOCUMENTS 3,607,440 A    9/1971   Daniel et al.
4,137,376 A    1/1979   Clegg et al.
(Continued)

FOREIGN PATENT DOCUMENTS

| CN | 202310441 U | 7/2012 |
| FR | 2993708 A1  | 1/2014 |
| JP | H635540     | 5/1994 |

OTHER PUBLICATIONS

U.S. Appl. No. 15/286,952, "Non-Final Office Action", dated Mar. 5, 2019, 19 pages.
(Continued)

*Primary Examiner* — Gregg Cantelmo
(74) *Attorney, Agent, or Firm* — Kilpatrick Townsend & Stockton LLP

(57) ABSTRACT

A battery system includes a can with a lip around an opening. At least an interior surface of the can is anodized and the lip of the can includes a longer and shorter side. The can further includes a flange on the longer side of the lip and a plurality of layers that are inserted into the can. The plurality of layers includes a battery cell and a thermally conducting layer with a fin and the fin has a spring force that pushes the fin towards the anodized interior surface. The battery system further includes a lid that is configured to cover the opening of the can, where the flange is configured to wrap around the lid when the lid covers the opening of the can.

20 Claims, 10 Drawing Sheets

Figure 1:
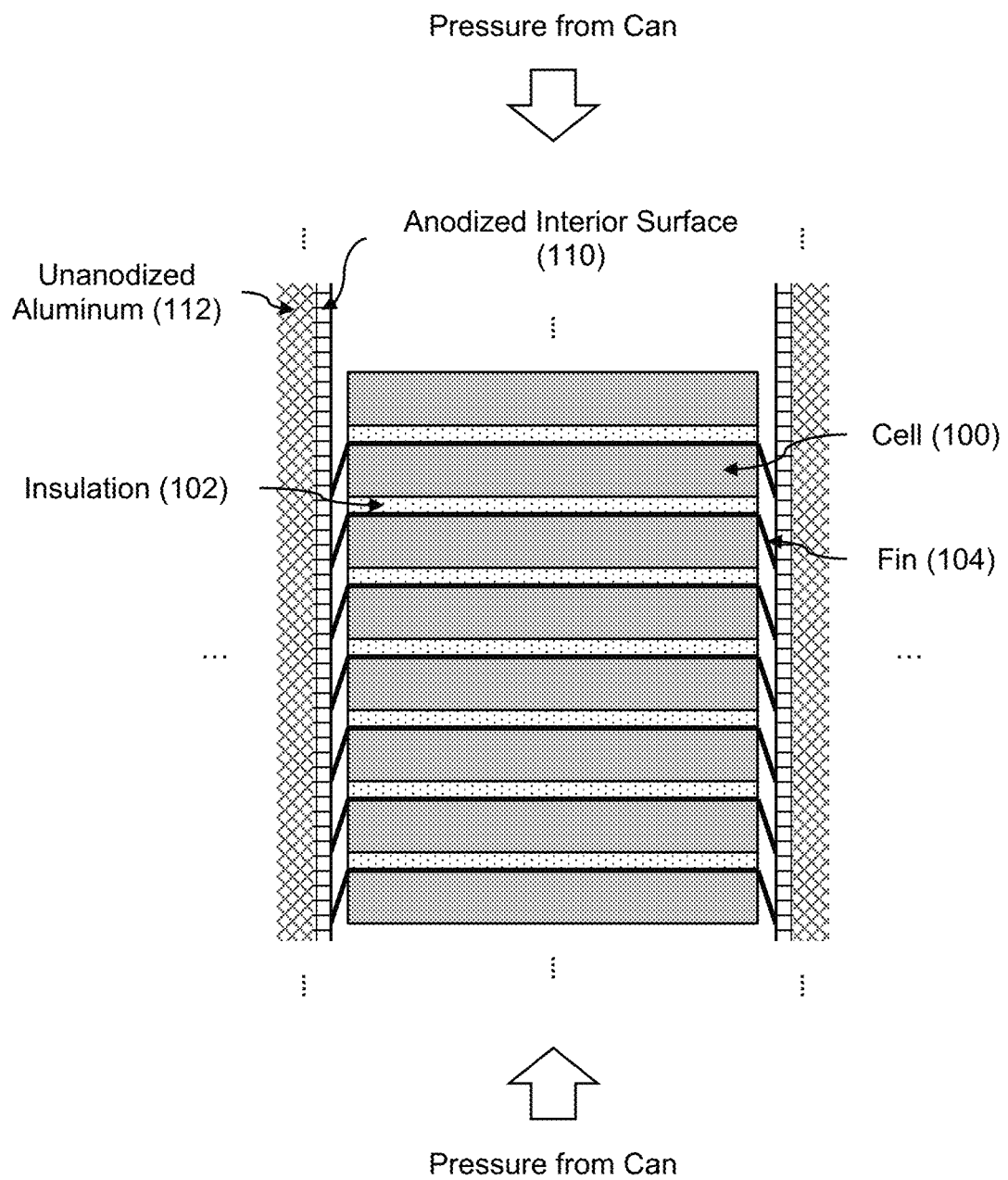

(51) Int. Cl.
  *H01M 10/6551* (2014.01)
  *H01M 2/12* (2006.01)
  *H01M 2/10* (2006.01)
  *H01M 2/04* (2006.01)
  *H01M 10/04* (2006.01)
(52) U.S. Cl.
  CPC ..... *H01M 2/1282* (2013.01); *H01M 10/0481* (2013.01); *H01M 10/658* (2015.04); *H01M 10/6551* (2015.04)
(58) Field of Classification Search
  CPC ............ H01M 10/617; H01M 10/655; H01M 10/6551; H01M 10/658; H01M 2/04; H01M 2/1077; H01M 2/1282; H01M 10/0481; H01M 2/1082
  See application file for complete search history.

(56) References Cited

U.S. PATENT DOCUMENTS

| | | | |
|---|---|---|---|
| 5,354,630 A | 10/1994 | Earl et al. | |
| 5,438,100 A | 8/1995 | Shinozaki et al. | |
| 5,670,272 A | 9/1997 | Cheu et al. | |
| 6,087,036 A * | 7/2000 | Rouillard | H01M 2/202 429/120 |
| 6,372,377 B1 | 4/2002 | Ovshinsky et al. | |
| 8,865,337 B2 * | 10/2014 | Culver | H01M 2/206 429/151 |
| 8,993,145 B2 | 3/2015 | Muniz | |
| 10,593,920 B2 | 3/2020 | Melack et al. | |
| 2005/0110458 A1 * | 5/2005 | Seman, Jr. | H01M 2/204 320/114 |
| 2005/0132562 A1 | 6/2005 | Saito et al. | |
| 2005/0253553 A1 | 11/2005 | Phillips et al. | |
| 2005/0269995 A1 | 12/2005 | Donnelly et al. | |
| 2006/0273758 A1 * | 12/2006 | Sanada | H01M 2/0212 320/107 |
| 2008/0169788 A1 * | 7/2008 | Bobbin | H02J 7/0029 320/135 |
| 2010/0112425 A1 | 5/2010 | Du Nn | |
| 2011/0027630 A1 | 2/2011 | Tsutsumi et al. | |
| 2012/0003508 A1 | 1/2012 | Narbonne et al. | |
| 2012/0009455 A1 | 1/2012 | Yoon | |
| 2012/0058386 A1 | 3/2012 | Wyser et al. | |
| 2013/0022859 A1 | 1/2013 | Lim | |
| 2013/0101890 A1 | 4/2013 | Ogg et al. | |
| 2013/0130087 A1 | 5/2013 | Kawaguchi et al. | |
| 2013/0255293 A1 | 10/2013 | Gadawski et al. | |
| 2013/0273400 A1 | 10/2013 | Musetti | |
| 2013/0316214 A1 | 11/2013 | Nagashima | |
| 2014/0045024 A1 | 2/2014 | Waters | |
| 2014/0154535 A1 | 6/2014 | Olsson et al. | |
| 2014/0186683 A1 | 7/2014 | Tyler et al. | |
| 2014/0227576 A1 * | 8/2014 | Meintschel | H01M 2/024 429/120 |
| 2014/0272494 A1 * | 9/2014 | Silk | H01M 10/04 429/72 |
| 2014/0356690 A1 | 12/2014 | Kim | |
| 2015/0037649 A1 * | 2/2015 | Wyatt | H01M 10/625 429/120 |
| 2015/0037662 A1 | 2/2015 | Pinon et al. | |
| 2015/0050535 A1 * | 2/2015 | Amiruddin | H01M 4/133 429/94 |
| 2015/0214570 A1 | 7/2015 | Deponte et al. | |
| 2015/0226615 A1 | 8/2015 | Feldman et al. | |
| 2015/0255826 A1 | 9/2015 | Turner | |
| 2015/0283965 A1 | 10/2015 | Lynds | |
| 2016/0079639 A1 | 3/2016 | Pinon | |
| 2016/0093847 A1 | 3/2016 | Gunther et al. | |
| 2016/0197385 A1 | 7/2016 | Matsumoto et al. | |
| 2016/0218339 A1 | 7/2016 | Nishimori et al. | |
| 2016/0336627 A1 | 11/2016 | Syed et al. | |
| 2017/0190264 A1 | 7/2017 | Kim et al. | |
| 2017/0222284 A1 | 8/2017 | Ottomano et al. | |
| 2018/0026296 A1 | 1/2018 | Kruger et al. | |
| 2018/0048036 A1 | 2/2018 | Melack et al. | |

OTHER PUBLICATIONS

European Application No. EP17839952.3, "Partial Supplementary European Search Report", dated Jan. 3, 2020, 11 pages.
New Zealand Application No. NZ750395, "First Examination Report", dated Jul. 23, 2019, 4 pages.
PCT/US2017/024458, "International Preliminary Report on Patentability", dated Feb. 21, 2019, 7 pages.
PCT/US2017/024458, "International Search Report and Written Opinion", dated Jun. 19, 2017, 7 pages.
PCT/US2019/036936, "International Search Report and Written Opinion", dated Sep. 5, 2019, 9 pages.
U.S. Appl. No. 16/102,315, "Non-Final Office Action", dated Oct. 9, 2018, 13 pages.
International Search Report and Written Opinion—PCT/US2018/049375—ISA/EPO—dated Nov. 30, 2018.
U.S. Appl. No. 16/102,315, "Final Office Action", dated Jan. 18, 2019, 17 pages.
U.S. Appl. No. 16/102,315, "Non-Final Office Action", dated May 3, 2019, 10 pages.
CN202310441U Google Machine translation printed Feb. 18, 2019.
JPH0635540 Google Machine translation printed Feb. 18, 2019.
Meyer et al. [Meyer] (Home Power, vol. 119 Jun. and Jul. 2007 pp. 50-55).
U.S. Appl. No. 16/102,315, "Final Office Action", dated Jun. 21, 2019, 9 pages.
U.S. Appl. No. 15/286,952, "Notice of Allowance", dated Aug. 23, 2019, 12 pages.
U.S. Appl. No. 16/102,315, "Notice of Allowance", dated Oct. 1, 2019, 6 pages.
U.S. Appl. No. 16/102,315, "Notice of Allowance", dated Nov. 5, 2019, 5 pages.

* cited by examiner

CAPACITANCE REDUCING BATTERY SUBMODULE WITH THERMAL RUNAWAY PROPAGATION PREVENTION AND CONTAINMENT FEATURES

CROSS REFERENCE TO OTHER APPLICATIONS

This application claims priority to U.S. Provisional Patent Application No. 62/688,744 entitled BATTERY SUBMODULE WITH IMPROVED RELIABILITY AND PERFORMANCE filed Jun. 22, 2018 which is incorporated herein by reference for all purposes.

BACKGROUND OF THE INVENTION

New types of battery submodules have been developed which include compressed and stacked (e.g., interleaved) layers of battery cells, insulation (e.g., thermal and/or electrical), and fins (e.g., for drawing out heat from the interior of the battery submodule). Additional improvements to further improve the reliability and/or performance of such battery submodules would be desirable.

BRIEF DESCRIPTION OF THE DRAWINGS

Various embodiments of the invention are disclosed in the following detailed description and the accompanying drawings.

FIG. 1 is a diagram showing an embodiment of a battery submodule where the interior surface of the can is anodized.

FIG. 2 is a diagram illustrating an embodiment of an electrically conductive frame which is used to hold a plurality of assembled battery submodules.

FIG. 3A is a diagram illustrating a top view of an embodiment of a can with a flange.

FIG. 3B is a diagram illustrating a perspective view of an embodiment of a can with a flange.

FIG. 3C is a diagram illustrating a side view of an embodiment of a can with a flange.

FIG. 3D is a diagram illustrating a side view of an embodiment of a can with a flange after the flange is wrapped around the lid.

FIG. 4A is a diagram illustrating an example of a thermally conducting layer with basic fins.

FIG. 4B is a diagram illustrating an embodiment of a thermally conducting layer with feathered fins.

FIG. 5A is a diagram illustrating a perspective view of an embodiment of a thermally conducting layer with multi-fold fins.

FIG. 5B is a diagram illustrating a side view of an embodiment of a thermally conducting layer with multi-fold fins.

FIG. 6A is a diagram illustrating a perspective view of an embodiment of compressible cords that are placed between a battery cell and fins.

FIG. 6B is a diagram illustrating a side view of an embodiment of compressible cords that are placed between a battery cell and fins.

FIG. 6C is a diagram illustrating a side view of an embodiment of compressible cords that are placed between a battery cell and fins and are in a compressed state.

FIG. 7 is a diagram illustrating an embodiment of a lid with a recessed and/or shorter connector.

FIG. 8 is a diagram illustrating an example of an older lid.

FIG. 9 is a diagram illustrating an embodiment of a top plate with a printed circuit board (PCB) with dual wire bonds and potting.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of improvements to a battery submodule (where the battery submodule includes stacked layers of battery cells, insulation (e.g., thermal and/or electrical), and thermally conducting layers with fins in a can with a lid) are described herein. For simplicity and ease of explanation, at least some features and/or improvements are described separately or individually below. Naturally, various battery submodule embodiments can include various combinations of features and/or improvements even though a particular combination of features and/or improvements may not necessarily be described specifically herein.

In some embodiments, a system (e.g., a battery submodule) includes a can with a lip around an opening. At least an interior surface of the can is anodized, the lip of the can includes a longer side and a shorter side, and the can further includes a flange on the longer side of the lip. The system further includes a plurality of (e.g., stacked) layers that are inserted into the can where the plurality of layers includes a battery cell and a thermally conducting layer with a fin. The fin has a spring force that pushes the fin towards the anodized interior surface of the can. The system further includes a lid that is configured to cover the opening of the can where the flange is configured to wrap around the lid when the lid covers the opening of the can.

In some embodiments, a system (e.g., a battery submodule) includes a can with an opening and a plurality of layers that are inserted into the can. The plurality of layers includes a battery cell and a thermally conducting layer with a fin. The fin includes a plurality of independent sections, where each section has an independent spring force that independently pushes that section of the fin towards an interior surface of the can. The system further includes a lid that is configured to cover the opening of the can.

In some embodiments, a system (e.g., a battery submodule) includes a can with an opening and a plurality of layers that are inserted into the can. The plurality of layers includes a battery cell and a thermally conducting layer with a multi-fold fin with a plurality of folds; the multi-fold fin has a spring force that pushes the multi-fold fin towards an interior surface of the can. The system further includes a lid that is configured to cover the opening of the can.

In some embodiments, a system (e.g., a battery submodule) includes a can with an opening and a plurality of layers that are inserted into the can. The plurality of layers includes a battery cell and a thermally conducting layer with a multi-fold fin with a plurality of folds. The fin has a spring force that pushes the multi-fold fin towards an interior surface of the can. A compressible material is placed between the fin and the plurality of layers, where the compressible material provides an additional spring force that pushes the multi-fold fin towards the interior surface of the can. The system further includes a lid that is configured to cover the opening of the can.

FIG. 1 is a diagram showing an embodiment of a battery submodule where the interior surface of the can (or, more generally, container or case) is anodized. In the example shown, a top view of the battery submodule without the lid on is shown. The can's contents include stacked layers of (battery) cells (100), insulation (102), and a thermally conducting layer with fins (104), sometimes referred to herein more simply as a fin. The layer of insulation (102) in some embodiments is a layer of thermal insulation (e.g., to keep heat from one battery cell spreading to other battery cells).

In this example, the cells are pouch cells. Pouch cells perform better when pressure is applied (e.g., ~3-5 PSI). More specifically, the cycle life of pouch cells can be extended by applying pressure to the pouch cells. For this reason, the stacked layers shown here are compressed by the can (e.g., perpendicular to the largest surface of the pouch cell).

In this example, because the insulation (like all of the stacked layers) will be compressed, the insulation is made up of a material which can withstand (e.g., without collapsing) the expected pressure from the compressed can. For example, using the spring constant of a material as a metric of interest, the spring constant of the insulation should be non-negligible. In some embodiments, the insulation is made of aerogel which is a good thermal insulator and has a non-negligible spring constant.

Thermally, the layers of insulation prevent (or at least slow down and/or mitigate) heat from spreading from one cell to another cell. For example, suppose one cell fails catastrophically and in the process releases a large amount of heat. Without any insulation, all of that heat would propagate to a neighboring cell and cause that cell to also fail catastrophically. Eventually, all of the cells would fail catastrophically in a domino-like effect. This positive feedback cycle, domino-like effect (e.g., at the cell or battery level) is sometimes referred to as thermal runaway. The layers of insulation prevent (or at least slow down and/or mitigate) thermal runaway from happening (at least at the cell level).

The thermally conductive layer with the fins in this example are made of a thermally conductive material and acts as a heat sink for the cell, removing the heat produced by the cell (e.g., during normal operation and/or a catastrophic failure) from the interior of the stacked layers to the exterior. Thermally, the thermally conductive layer with the fins are made of a material which is thermally conductive so that the thermally conductive layer with the fins can conduct heat away from the cell. Structurally, the fins act like a spring and push back when pressure is applied. This spring-like effect is useful because physical contact with the interior of the can is ensured even if there is some (e.g., air) gap around the fin. For example, if the edges of the layers are not aligned and/or the layers have different widths, then the fin may not be "squished" between the interior of the can and the side of the cell. The thermal conductor layer is better able to conduct heat when the fin is physically touching the can, so having the fin act like a spring ensures the fin always touches the can and has good thermal properties even if there is a gap around a bent portion of the fin. In some embodiments, the thermally conductive layers with the fins are made of metal (e.g., 1235 series Al) because metal is a good thermal conductor and permits the fin to act like a spring.

One problem with earlier prototypes of the battery submodule is that the contact between the fins and the interior surfaces of the can would sometimes unintentionally create a capacitance which undesirably affected the performance of the battery submodule. In this example, to prevent (or at least mitigate) any capacitance formed by the fins touching the interior surfaces of the can, the interior surfaces of the can are anodized (110). This is because anodization increases the electrical resistance and/or insulation of the anodized surface so that the anodized interior surface acts less like a capacitor. In the diagram shown here, only the interior side of the can is anodized (110). The exterior and top of the can (112) is left unanodized to better retain the properties of the thin walled aluminum can. In some embodiments, the can is made of 1060-O aluminum. In various embodiments, the exterior surface of the can may be anodized or unanodized.

Another problem with earlier versions of the battery submodule is that the layers would sometimes get out of alignment with each other. To address this, in some embodiments, two or more layers are attached to each other using tape or some other adhesive. For example, a battery cell may be taped to its adjacent thermally conductive layer because the battery cell and thermally conductive layers have smooth, slippery surfaces whereas the insulation has a rougher, "grippier" surface. This may, for example, prevent layers from slipping out of alignment during the assembly process.

In some embodiments, other parts of the can (e.g., in addition to or as an alternative to the interior surfaces of the can) are anodized. The following figure describes an example of this.

Figure 2:
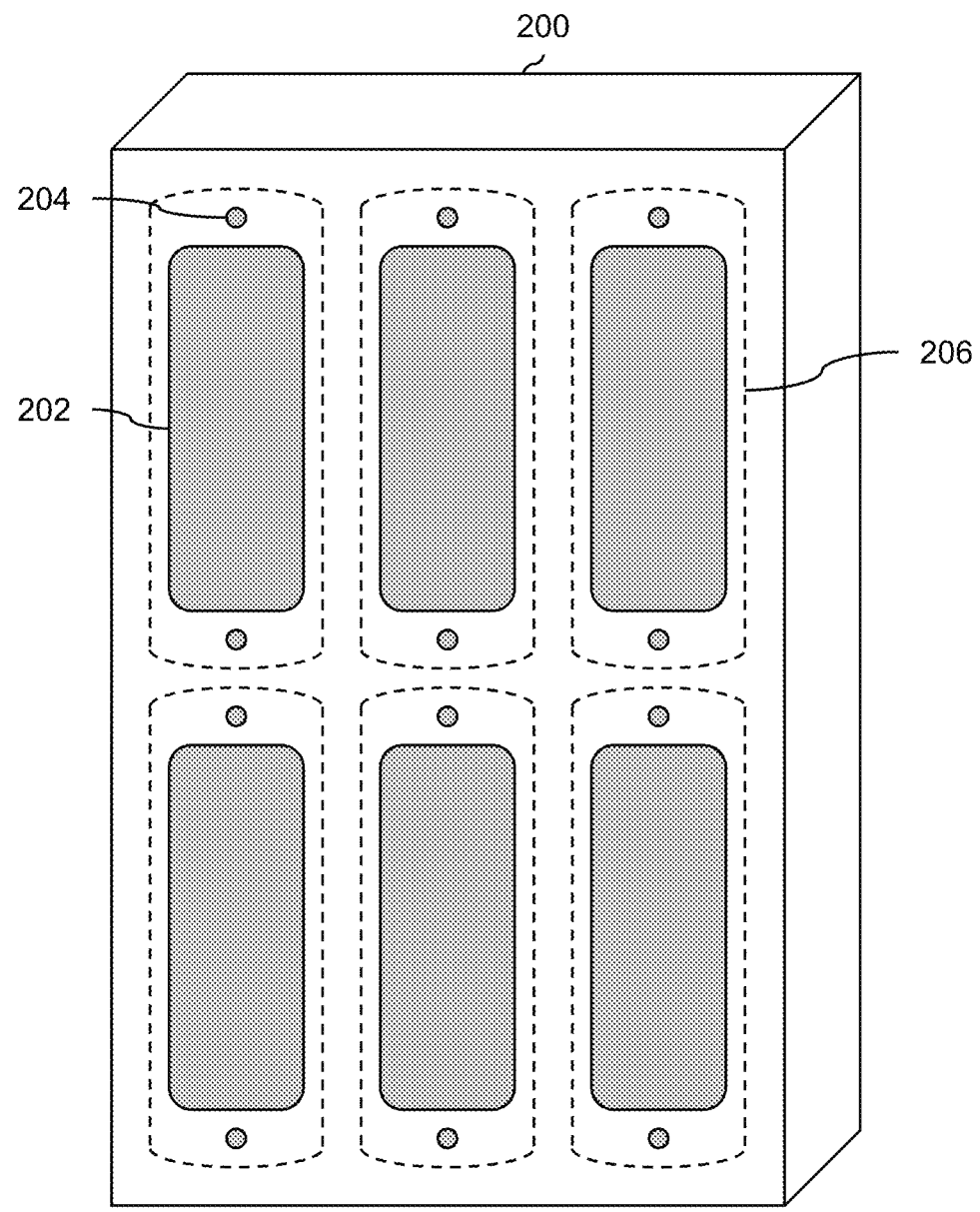

FIG. 2 is a diagram illustrating an embodiment of an electrically conductive frame which is used to hold a plurality of assembled battery submodules. In the example shown, a frame or rack (200) is used to hold assembled battery submodules (not shown) in place. The frame is designed to have six battery submodules inserted into the surface shown here and six more on the opposite surface (not shown). Naturally, the number of battery submodules held by the frame shown here is merely exemplary and is not intended to be limiting.

Cutouts (202) in the frame show where each of the assembled battery submodules are inserted into the frame. The cans of the battery submodules (not shown) have a lip (e.g., perpendicular to the (side) walls of the can) so that the can is inserted up to the lip of the can. To secure the battery submodules to the frame, two screw holes (204) are drilled or otherwise formed in the frame. The can of a battery submodule has similarly aligned holes, and a screw passes through the hole in the can and then through the corresponding hole in the frame to secure the battery submodules to the frame. For context, dashed outlines 206 show where the cans would rest against the surface of the frame when secured by the screws.

Earlier prototypes revealed that the frame with the battery submodules inserted could unintentionally create (e.g., large) capacitances which in turn would unintentionally store energy at a high voltage. This is dangerous because a worker could potentially touch the frame with the battery submodules inserted and be injured (or at least receive an uncomfortable electric shock) from the electrical discharge.

In this example, to mitigate this, parts of the can that come into contact with the frame are anodized, which mitigates the unintentional buildup of charge. For example, this may include anodizing the inside of the screw holes in the can, the underside of the lip of the can, and/or the top part of the exterior surfaces of the can.

In some embodiments, a can includes a flange to help secure the lid to the can. The following figure describes one such example.

Figure 3A:
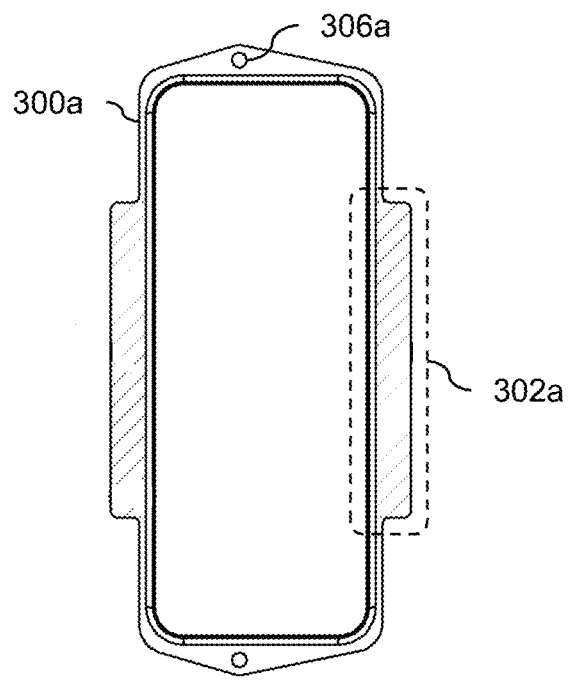

FIG. 3A is a diagram illustrating a top view of an embodiment of a can with a flange. In the example shown, a top view of a can (300a) is shown where the lip of the can includes flanges (302a) on the longer edge of the can. The flange is used to more securely fasten a lid (not shown) to the top of the can. For example, when a lid is attached to the top of the can, the flange is wrapped around the lid to more securely fasten the lid to the top of the can. It is noted that the flange is located at the longer side or length of the can, which is structurally weaker than the shorter side or length and where hot gases within the body of the can are more likely to escape.

In some embodiments, gas is less likely to escape between the lid and the can on the shorter sides because screws on those sides (e.g., used to secure the battery submodule to the frame (200) shown in FIG. 2) are effective at securing the lid and the can to each other on those (shorter) sides. See, for example, screw holes 306a in FIG. 3A and screw holes 306b in FIG. 3B which are on the shorter sides of the can's lip and through which a screw would pass. The presence of the screws makes it difficult for a flange to wrap around the lid on those (shorter) sides and/or obviates the need for a flange on those (shorter) sides because gas is less likely to escape at those sides.

Figure 3B:
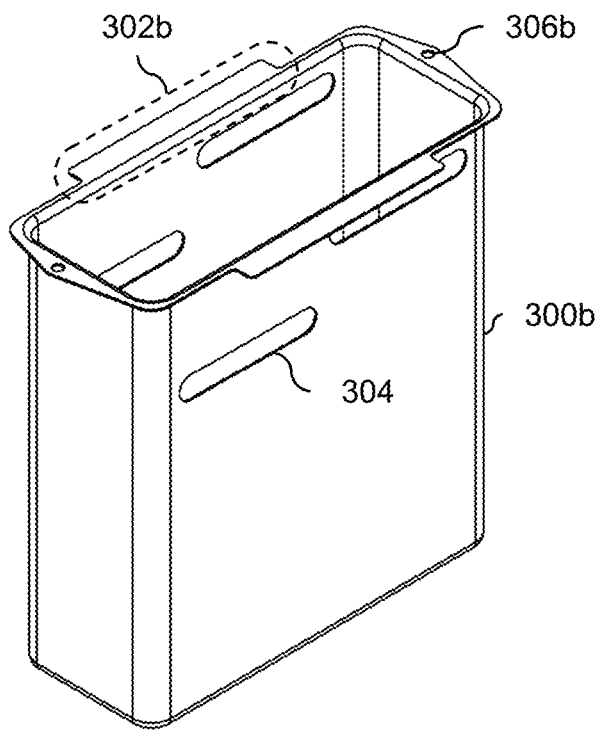

FIG. 3B is a diagram illustrating a perspective view of an embodiment of a can with a flange. From the view shown here, other features of the can (300b) can be seen, including the cutouts or vents (304) via which hot gases (e.g., released by failing battery cells during thermal runaway) can escape from inside the battery submodule. In some embodiments, the cutouts are covered by a tape or other material (not shown) which melts from the heat of the hot gases, permitting the gases to escape. During normal operation, the tape or other covering prevents debris from entering the battery submodule.

Previous prototypes of the battery submodule encountered a problem when hot gases were released by failing battery cell(s) during thermal runaway. Instead of escaping from the cutouts shown, the gases would instead put pressure where the lid is connected to the can and escape between the can and the lid. For example, previous designs only used a double-sided adhesive to secure the lid to the can.

Returning briefly to FIG. 2, having hot and/or toxic gases escape via the top of the battery submodules (e.g., between the lid and the can) is undesirable because when the battery submodules are inserted in the frame shown in FIG. 2, the escaping gas could enter the fuselage. In contrast, the interior of the frame shown in FIG. 2 includes venting for hot and/or toxic gases to escape in a safe manner, so it is preferable for the gases to escape via the cutouts in the can. To put it another way, the design of the aircraft and/or frame expects hot and/or toxic gases to exit via the cutouts, not via a gap between the lid and the can.

Returning to FIGS. 3A and 3B, the flange (302a and 302b) more securely fastens the lid to the top of the can by wrapping around the lid. This better prevents hot and/or toxic gases from escaping via a gap between the lid and the can. The following figures show this from a side view.

Figure 3C:
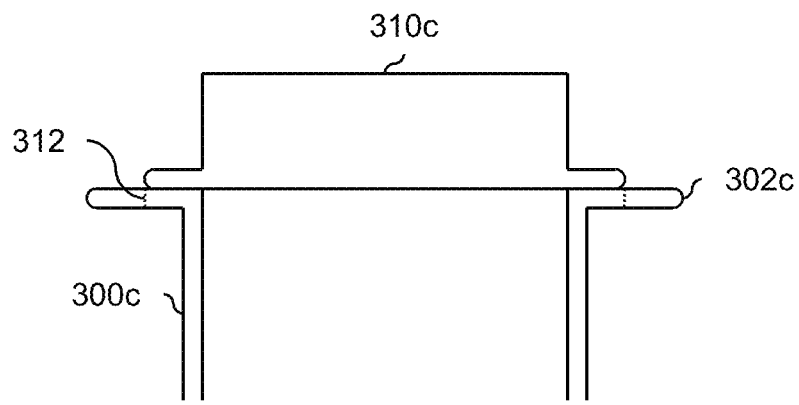

FIG. 3C is a diagram illustrating a side view of an embodiment of a can with a flange. In this example, a lid (310c) is resting on the lip of the can (300c) so that the lid covers the opening of the can. The flange (302c) has not yet been wrapped around the lid. For clarity and brevity, the contents of the can are not shown in this example, but typically the opening of the can is closed up using the lid after all of the contents (e.g., the stacked layers) have been inserted into the can. In the state shown here, the flanges (302c) on the longer side of the lip have not yet been wrapped around the lid. For context, a dotted line (312) shows the edge of the lip where there is no flange (e.g., towards the corners of the can).

Figure 3D:
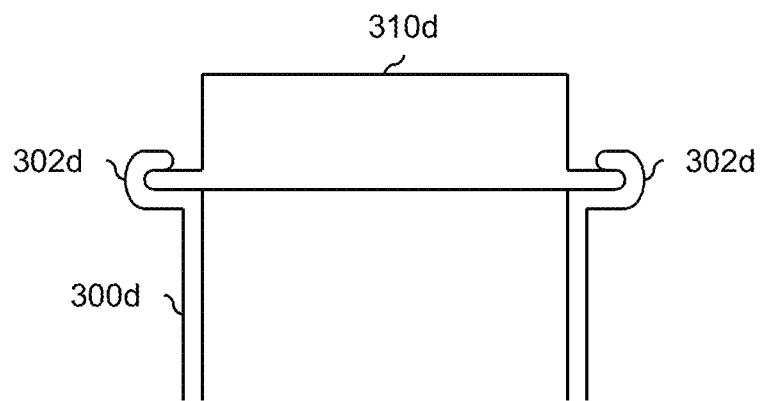

FIG. 3D is a diagram illustrating a side view of an embodiment of a can with a flange after the flange is wrapped around the lid. In the state shown here, the flanges (302d) have been wrapped around the lid (310d), specifically the edges of the bottom surface that comes into contact with the lip of the can (300d). This better secures the lid to the can (e.g., in addition to any other devices and/or techniques that attach the lid to the can, such as a glue or adhesive between the lip and the bottom of the lid) to prevent any hot gases from escaping between the lid and the can. Instead, the gases are more likely to escape through some other preferred route (e.g., vents 304 in FIG. 3B).

In some embodiments, the can is anodized and the can includes a flange. Anodization can make aluminum (which the can is made of) brittle. If the aluminum is too brittle at the flange, the flange can break off when it is being wrapped around the lid. To prevent the flange from breaking off during assembly, in some embodiments the flange is not anodized (e.g., even if other parts of the can are anodized). For example, prior to the anodization process, tape or other protective material may be applied to the flange to prevent the flange from being anodized. Any appropriate technique to selectively anodize the can may be employed.

In some embodiments, the entire can (e.g., interior surfaces, flanges, etc.) is lightly and/or superficially anodized so that the anodization offers the desired electrical insulation but the relatively thin layer of anodization is not thick enough to make the flange brittle enough to break off when wrapped around the lid. For example, suppose the flanges have a height (thickness) of 0.020 inches. If the flanges are anodized so that an anodization layer is created that is within a range of 0.0002-0.0005 inches thick, the flanges will remain supple enough so that they will not break when bent. In some embodiments, the anodization is that specified by MIL-A-8625 Type 2, Class 2. Anodizing only a relatively thin layer of the entire can may be desirable in some applications because it simplifies and/or speeds up the manufacturing process (e.g., no need to apply tape, can submerge the entire can instead of carefully keeping part of the can out of the anodization fluid, etc.).

Returning briefly to FIG. 1, the (pouch) cells (100) in the battery submodules need to be cooled in order to perform effectively. However, due to uneven interior surfaces of the can, the edges of the fins (104) do not always make good contact. To address this and improve the battery submodule's ability to draw heat out, various improvements to the fin may be employed. The following figures show some embodiments.

Figure 4A:
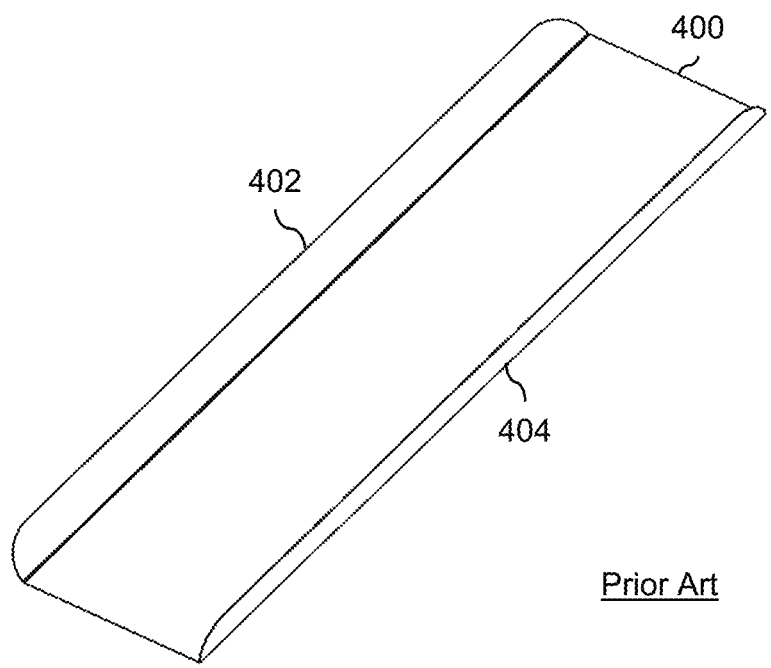

FIG. 4A is a diagram illustrating an example of a thermally conducting layer with basic fins. In this example, an earlier prototype of a thermally conducting layer is shown. This version has three planar portions: a center portion (400), where an adjacent layer sits or otherwise nestles in, and two fins (402 and 404) on the side. The two fins are created by bending the thermally conducting layer and creating a crease between the planar portions. This causes the fins to have a spring force, causing them to push against the interior surface of the can when the thermally conducting layers (in the stacked array) are inserted into the can. However, the fins sometimes will not touch the interior surfaces of the cans because the walls are bent or curved.

To address this, in some embodiments, the fins are cut or otherwise divided into sections that can bend or flex independently of each other. The following figure shows an example of this.

Figure 4B:
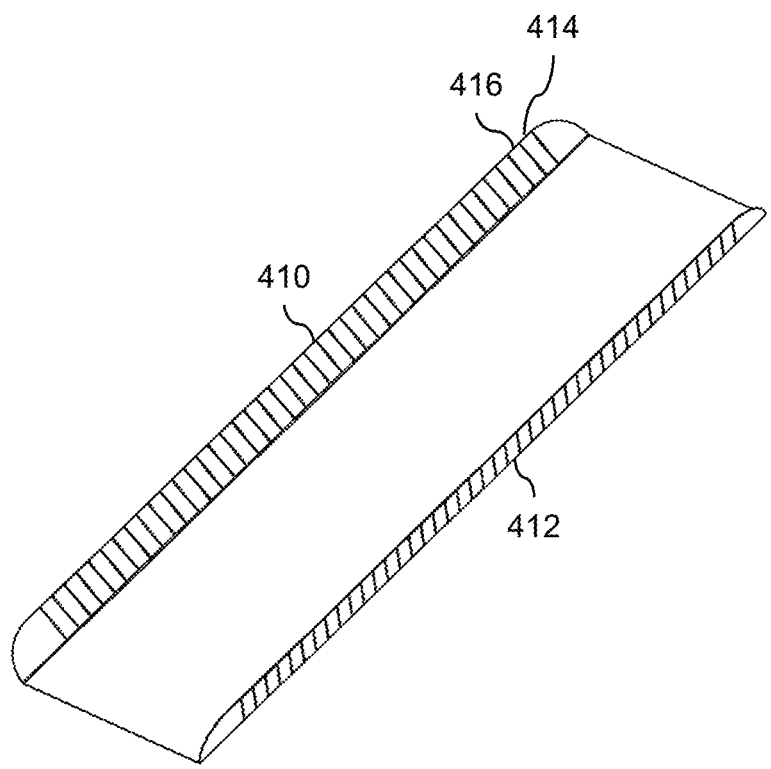

FIG. 4B is a diagram illustrating an embodiment of a thermally conducting layer with feathered fins. In this example, the fins (410 and 412) are cut to create a feathered fin. These cuts create independent sections (e.g., each with its own spring force and/or independent position) that can bend or flex independently of the other sections. That way, even if the section of the can (not shown) adjacent to section 414 bulges out towards feather 414 whereas the section of the can (not shown) adjacent to section 416 pulls away from feather 416, both sections can independently move in order to make contact with the can. In some embodiments, the edges of the feathered sections are radiused to improve the assembly process. Alternatively, the feathering cuts are angled in some embodiments to allow easier insertion in one direction.

Another approach to this problem is to increase the spring force of the fin. The following figure shows one embodiment that takes this approach.

Figure 5A:
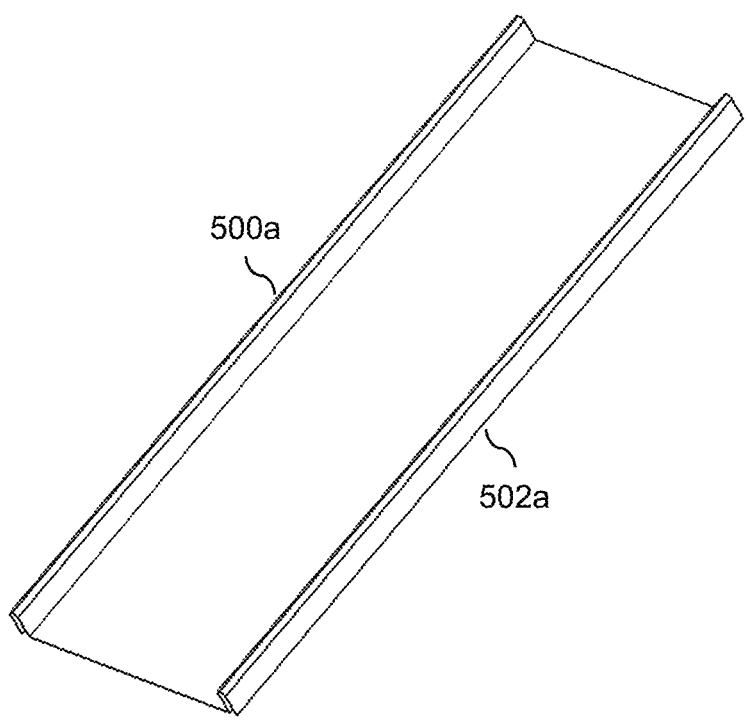

FIG. 5A is a diagram illustrating a perspective view of an embodiment of a thermally conducting layer with multi-fold fins. In this example, fins (500a and 502a) are created by folding or otherwise bending the thermally conducting layer multiple times. The fins shown here have two bends (each) and have a greater spring force than a fin formed using only a single bend (e.g., that shown in FIG. 4A). The following figure shows a side view and more clearly shows the multiple bends used to form the fins.

Figure 5B:
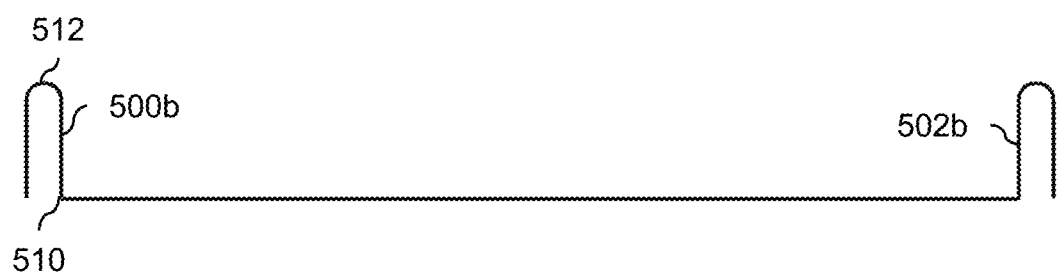

FIG. 5B is a diagram illustrating a side view of an embodiment of a thermally conducting layer with multi-fold fins. Fins 500b and 502b in this figure correspond respectively to fins 500a and 502a from FIG. 5A. As is more clearly shown here, each multi-fold fin includes two folds: a sharp bend or crease (510) in the thermally conducting layer and then a rounded bend (512) closer to the edge of the fin. It is noted that the shapes and/or geometries shown here are merely exemplary and are not intended to be limiting (e.g., the first bend (510) does not necessarily have to be sharp and/or a 90° change in direction, the second bend (512) does not necessarily need to be rounded and/or a 180° change in direction, etc.).

Another way to increase the spring force is to insert a compressible material between the fins and an adjacent battery cell. The following figures show an example of this.

Figure 6A:
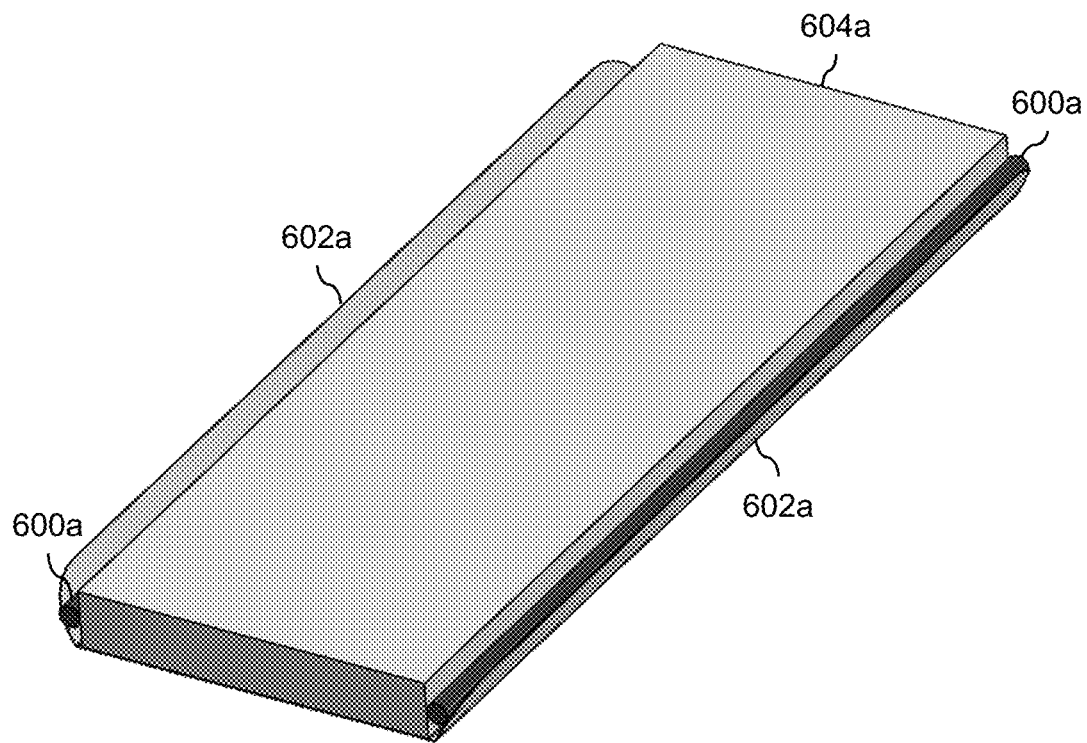

FIG. 6A is a diagram illustrating a perspective view of an embodiment of compressible cords that are placed between a battery cell and fins. In this example, two cords (600a) are placed (one on the left side and one on the right side) between the fins (602a) and the sides of a battery cell (604a) that is cradled by the thermally conducting layer with the fins (602a). To describe it more generally, a compressible material is placed or disposed between the (sides of the) stacked layers and the fins. The cords are made of a compressible material, such as silicone foam. When the stacked layers (which include the components shown here) are inserted into a can, the compressible cords will increase the spring force of the fins so that the fins make better contact with the interior walls of the can. This, in turn, improves the heat dissipation of the battery submodule. The following figure shows this example from a side view.

Figure 6B:
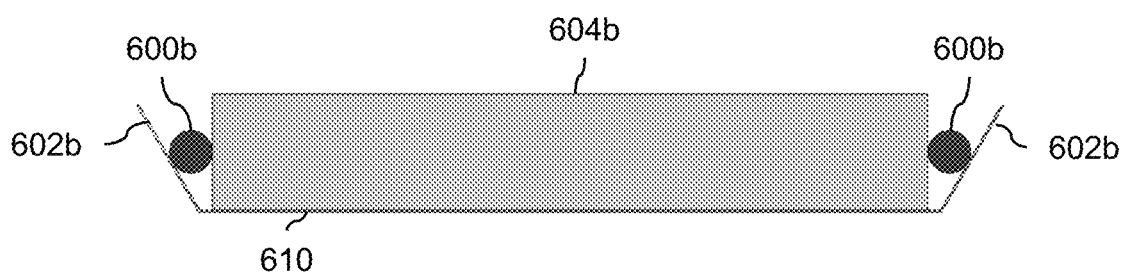

FIG. 6B is a diagram illustrating a side view of an embodiment of compressible cords that are placed between a battery cell and fins. In the state shown here, the stacked layers (which include the compressible cords (600b), the thermally conducting layer (610) with the fins (602b), and the battery cell (604b)) have not yet been inserted into the can. The compressible cords (600b) are therefore in their uncompressed state. The following figure shows the cords in their compressed state when the stacked layers are inserted into the can.

Figure 6C:
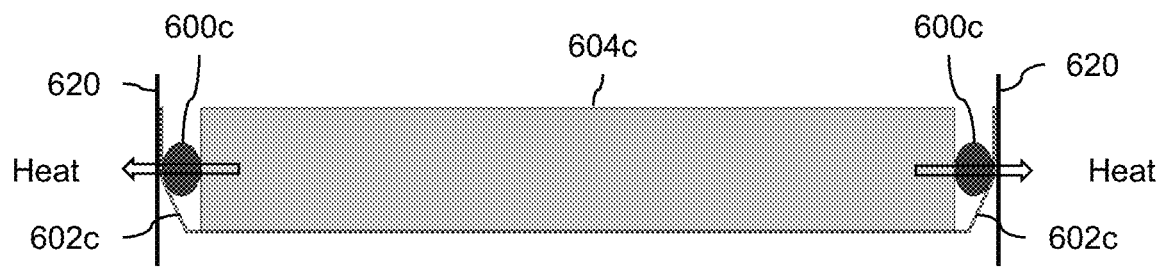

FIG. 6C is a diagram illustrating a side view of an embodiment of compressible cords that are placed between a battery cell and fins and are in a compressed state. In this example, the stacked layers have been inserted into a can (620). The compressible cords (600c), which are now in their compressed state, are sufficiently sized so that they increase the spring force of the fins (602c) so that the fins make better contact with the interior walls of the can (e.g., touching as opposed to not touching, a larger area of contact versus a smaller area of contact, etc.). The compressible cords (600c) also create a new path for heat to exit the battery submodule (e.g., from the battery cell (604c) to the compressible cord (600c) to the fin (602c) to the can (620)). Altogether, the compressible cords improve the heat dissipation of the battery submodule compared to when the compressible cords are not employed.

Although this example shows a single rope or cord on each side, some other embodiments may use multiple, shorter pieces of compressible material dispersed on each side. For example, multiple balls or spheres made of the compressible material may be distributed on each side. Or, each side may have multiple cylindrical pieces of the compressible material. For example, in some applications this may be desirable because it reduces weight and/or the cost of the materials.

In some embodiments, an adhesive (e.g., tape, glue, etc.) is used to hold the compressible material in place. For example, this may prevent the compressible material from slipping out of the pocket or space between the battery cell and fins.

The following figures describe examples of improvements to the lid. As will be described in more detail below, these improvements improve reliability and/or make assembly easier.

Figure 7:
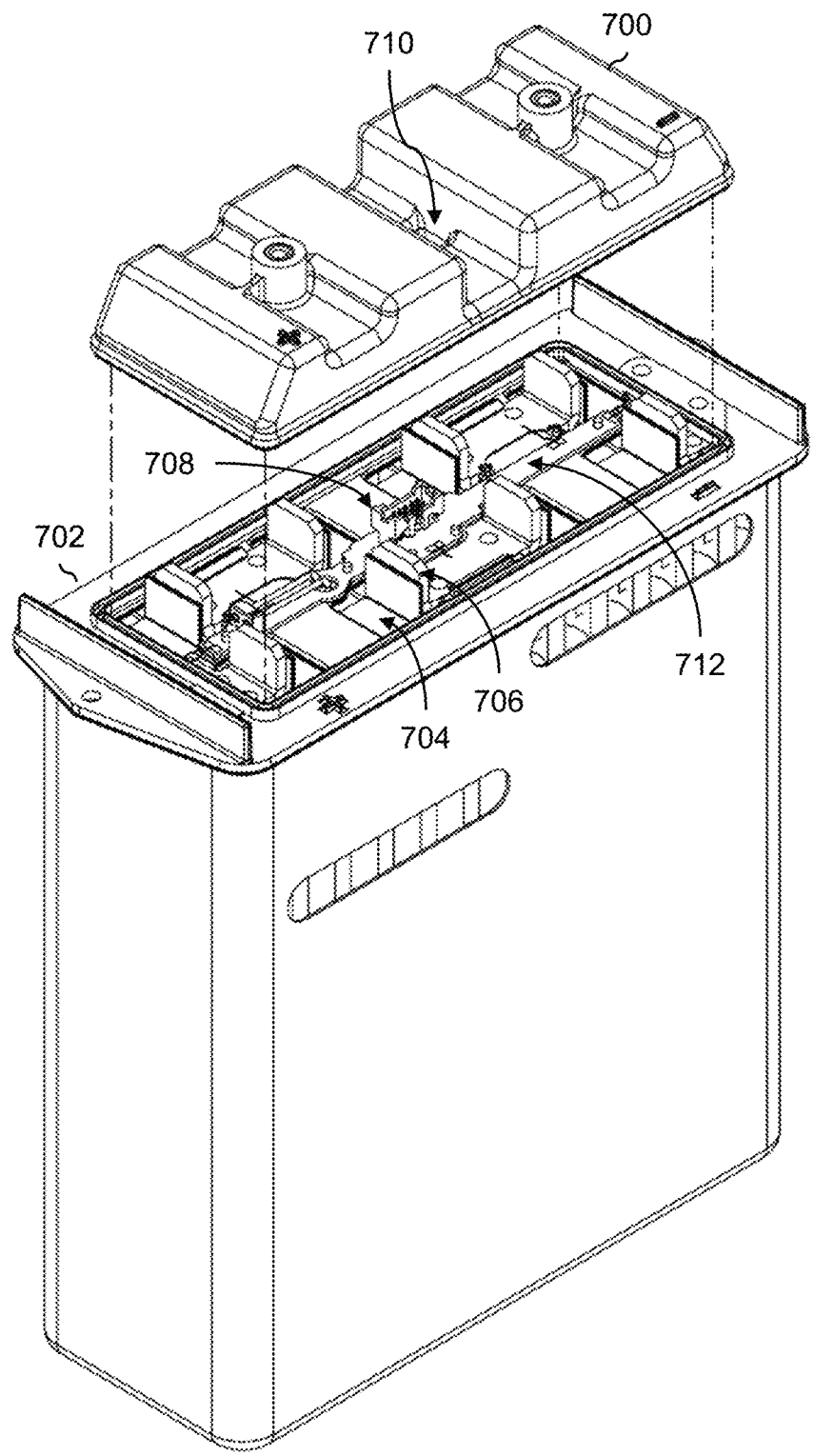

FIG. 7 is a diagram illustrating an embodiment of a lid with a recessed and/or shorter connector. In the example shown, the lid includes two parts: a tab cover (700) and a top plate (702). In this example, there are 12 cells in the battery submodule. The top plate includes openings (704) via which 12 positive tabs and 12 negative tabs (not shown) from the 12 battery cells pass through the top plate and are attached to copper tabs (706) on the top plate. Electrically, this produces four groups of electrically connected cells (where each group includes three battery cells).

The power supply output by the battery submodule is a combination of all 12 cells but to help with monitoring and/or management of the battery submodules, the voltages of the four groups are reported via an electrical connector (708). For example, the voltage of the first group-of-three, the voltage of the second group-of-three, and so on is/are reported. The electrical connector (708) fits through a recessed opening (710) in the tab cover (700) so that it is accessible when the tab cover is fastened to the top plate (702).

Figure 8:
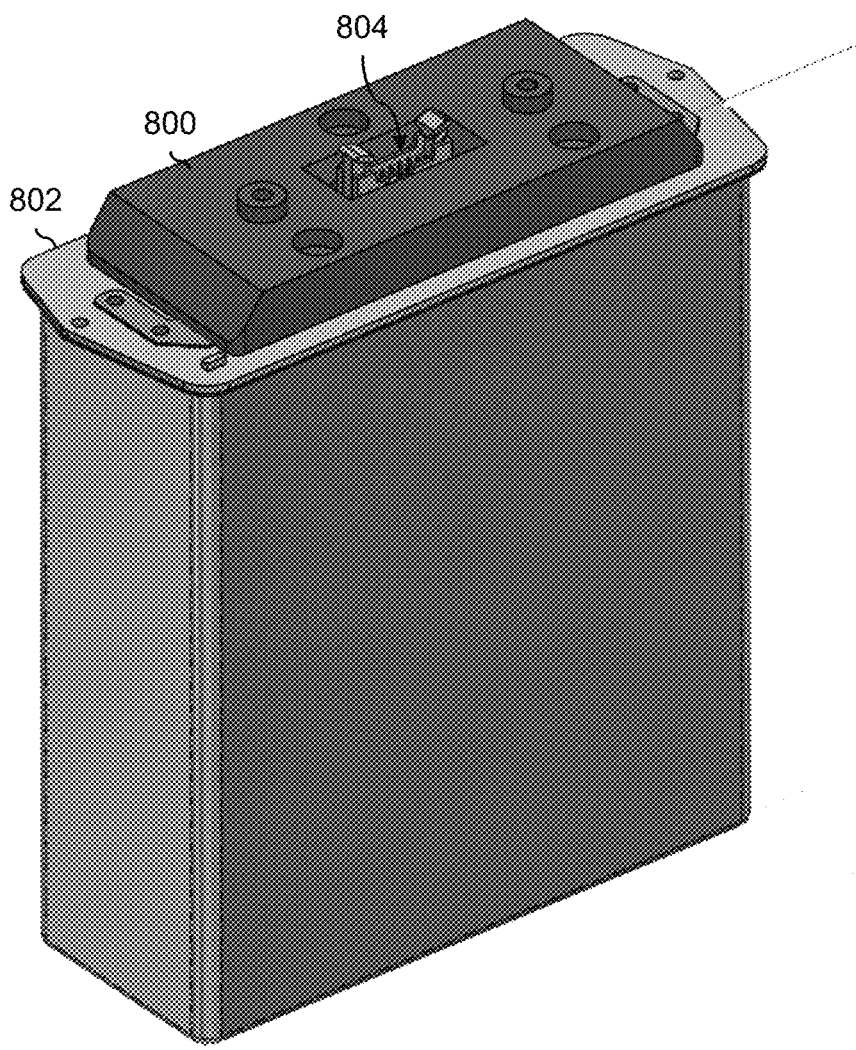

FIG. 8 is a diagram illustrating an example of an older lid. In this example, an older version of the lid is shown where the tab cover (800) and top plate (802) are both attached. The electrical connector (804) is shown protruding from the tab cover.

The new lid shown in FIG. 7 has a number of differences compared to the older version shown in FIG. 8. One change is that the new electrical connector (708) is shorter (e.g., closer to the surface of the top plate) and smaller, and does not have any tangs (e.g., clips) at the connector's sides to lock the connector into place. For example, the new connector (708) may have dimensions on the order of 0.1" by 0.3" whereas the older connector (804) has dimensions on the order of 0.2" by 0.5". This more unobtrusive connector may make assembly easier since the shorter and/or smaller connector does not block as much of the top plate, making access to the printed circuit board (712) and/or top plate (702) easier. Having the new connector (708) be recessed and/or otherwise protected by the tab cover (e.g., so that the connector is not the highest part of the lid) may also help protect or otherwise shield the connector. As shown here, in some embodiments, a lid includes a tang-less and recessed electrical connector.

The new tab cover (700 in FIG. 7) is also taller than the old tab cover (802 in FIG. 8). For example, with the older and shorter tab covers, some of the tabs from the battery cells inside the can would need to be trimmed due to the shorter height of the old tab cover. This trimming process is time consuming and could potentially damage the partially assembled battery submodule (e.g., because some welding or wiring breaks during trimming). To speed up the assembly process and reduce loss during the assembly process, the new tab covers (700 in FIG. 7) are taller which eliminates the need to trim the tabs extending from the battery cells. For example, the new tab covers are on the order of 0.35" high whereas the old tab covers are on the order of 0.25" high.

Other improvements to the new lid include how some electrical connections are made. The following figure shows an example of this.

Figure 9:
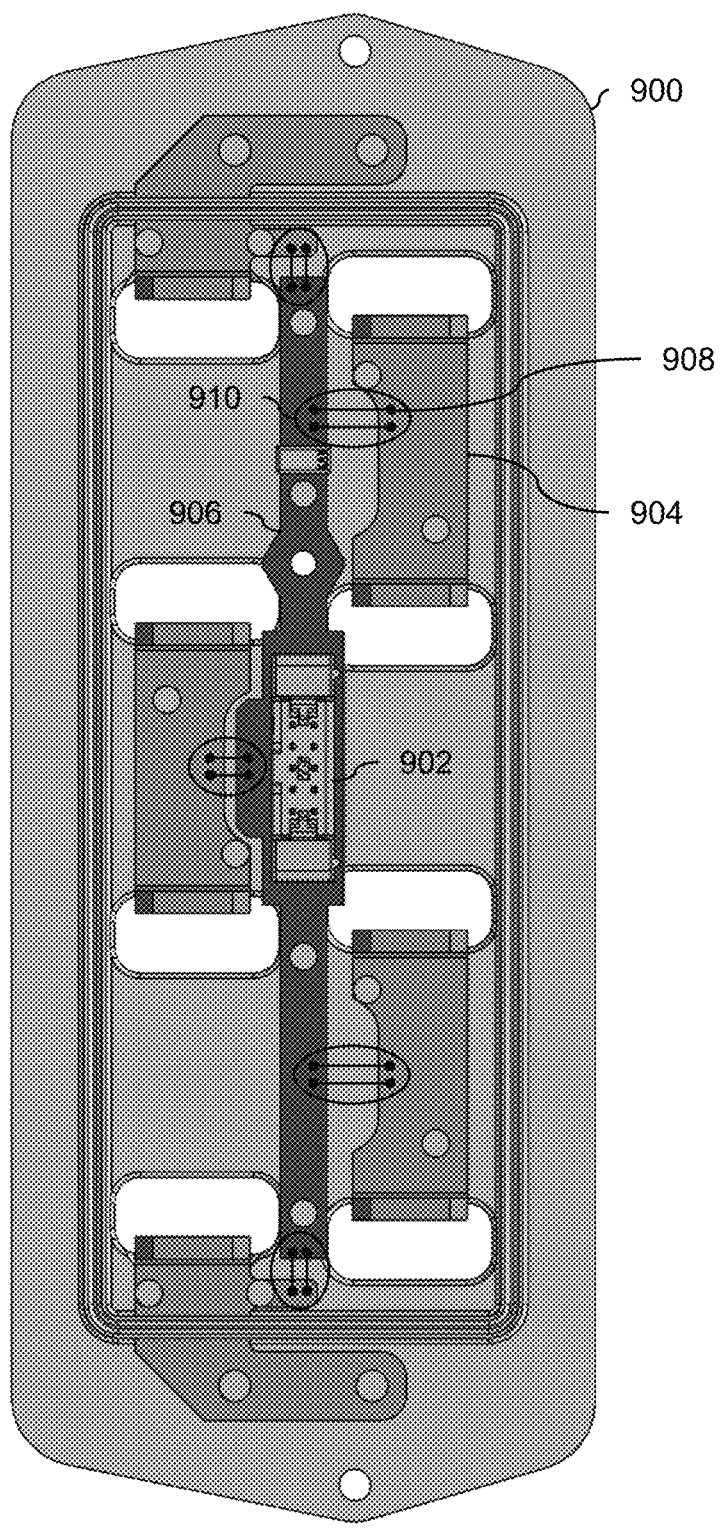

FIG. 9 is a diagram illustrating an embodiment of a top plate with a printed circuit board (PCB) with dual wire bonds and potting. In the example shown, a top view of a top plate (900) is shown. As described above, a connector (902) reports the voltages of the grouped battery cells within the battery submodule. To do that, the copper tabs (904), to which the tabs of the battery cells are connected, are connected to the PCB (906) using dual wire bonds (908) and potting (910). This ensure a good (e.g., robust) electrical and physical connection. For example, the battery submodule may be used in an aircraft and there may be significant vibrations from the lift fans/propellers which could break less robust connections. As shown here, in some embodiments, the lid includes an electrical connector that reports the voltages of the plurality of battery cells and an electrical connection in the lid, associated with reporting the voltages of the plurality of battery cells, includes dual wire bonds and potting.

In this example, the dual wire bonds have a diameter in the range of 0.001-0.010 inches. In various embodiments, the dual wire bonds are made of aluminum, copper, gold, a plated wire, etc. In this example, the potting is made of electrical equipment safe Silicon RTV (e.g., with no acetic acid).

In some embodiments, the bottom of the can includes a layer of high temperature insulation such as ceramic paper (alternatively, a ceramic blanket). In some embodiments, such cotronics is attractive because there is no dust (e.g., when cut and/or shaped) and it is easily shaped or cut. In some embodiments, the cotronics has the following properties:

Melting Point: 3200° F.
Continuous Service Temperature: 2300° F.
Construction: mat
Density: 12#/ft$^3$
Dielectric Strength: 100 volts/mil
Dielectric Constant: 1.61 @ $10^8$ cps
Loss Factor: 0.017
Specific Heat: 0.25 BTU/#° F.
Thermal Conductivity:
 BTU in/hr. ° F. ft.$^2$ @ 500° F.=0.38
  @ 1000° F.=0.60
  @ 1500° F.=0.90
  @ 2000° F.=1.33

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a can with a lip around an opening, wherein:
  at least an interior surface of the can is anodized;
  the lip of the can includes a longer side and a shorter side; and
  the can further includes a flange on the longer side of the lip;
 a plurality of layers that are inserted into the can, wherein:
  the plurality of layers includes a battery cell and a thermally conducting layer with a fin; and
  the fin has a spring force that pushes the fin towards the anodized interior surface of the can; and
 a lid that is configured to rest on the lip of the can and to cover the opening of the can, wherein the flange is configured to wrap around the lid when the lid covers the opening of the can.

2. The system recited in claim 1, wherein the flange is not anodized.

3. The system recited in claim 1, wherein the flange is anodized within a range of 0.0002-0.0005 inches thick.

4. The system recited in claim 1, wherein:
 the can does not have a flange on the shorter side of the lip; and
 the can further includes a screw hole on the shorter side of the lip.

5. The system recited in claim 1, wherein:
 the can does not have a flange on the shorter side of the lip;

the can further includes a screw hole on the shorter side of the lip; and the inside of the screw hole is anodized.

6. The system recited in claim 1, wherein the plurality of layers further includes a layer of thermal insulation.

7. The system recited in claim 1, wherein:

the battery cell includes a pouch cell; and the can applies a pressure within a range of 3-5 PSI to the plurality of layers.

8. The system recited in claim 1, wherein the lid includes a recessed electrical connector.

9. The system recited in claim 1, wherein:

the battery cell is one of a plurality of battery cells that are inserted into the can;

the lid includes:

an electrical connector that reports voltages of the plurality of battery cells;

a printed circuit board coupled to the electrical connector; and one or more tabs electrically connected to the plurality of battery cells, wherein the one or more tabs are connected to the printed circuit board via dual wire bonds and potting.

10. The system recited in claim 1 wherein the fin includes a plurality of independent sections adapted to move independently from each other, wherein each section has an independent spring force that independently pushes that section of the fin towards an interior surface of the can.

11. The system recited in claim 1 wherein the system includes a plurality of cans housed in a frame, a lip around an opening of each can resting on a corresponding opening in the frame, one of a surface of the lip of each can and a surface of the frame with which the lip is in contact being anodized.

12. A system, comprising:

a can with an opening;

a plurality of layers that are inserted into the can, wherein:

the plurality of layers includes a battery cell and a thermally conducting layer with a multi-fold fin with a plurality of folds;

the multi-fold fin has a spring force that pushes the multi-fold fin towards an interior surface of the can; and a compressible material is placed between the multi-fold fin and the plurality of layers, wherein the compressible material provides an additional spring force that pushes the multi-fold fin towards the interior surface of the can; and a lid that is configured to cover the opening of the can.

13. The system recited in claim 12, wherein the plurality of layers further includes a layer of thermal insulation.

14. The system recited in claim 12, wherein:

the battery cell includes a pouch cell; and the can applies a pressure within a range of 3-5 PSI to the plurality of layers.

15. The system recited in claim 12, wherein the lid includes a recessed electrical connector.

16. The system recited in claim 12, wherein:

the battery cell is one of a plurality of battery cells that are inserted into the can;

the lid includes:

an electrical connector that reports voltages of the plurality of battery cells;

a printed circuit board coupled to the electrical connector; and one or more tabs electrically connected to the plurality of battery cells, wherein the one or more tabs are connected to the printed circuit board via dual wire bonds and potting.

17. The system recited in claim 12, wherein at least an interior surface of the can is anodized, and the multi-fold fin has a spring force that pushes the multi-fold fin towards the anodized interior surface of the can.

18. The system recited in claim 12 wherein the plurality of layers further includes an adhesive layer to prevent slippage between the battery cell and the thermally conducting layer.

19. The system recited in claim 12, wherein the compressible material is held in place by an adhesive material.

20. The system recited in claim 12, wherein the compressible material is one of a cord, rope, ball, sphere and cylindrical piece.

* * * * *